United States Patent
Rothkop et al.

(10) Patent No.: US 6,812,833 B2
(45) Date of Patent: Nov. 2, 2004

(54) TURN SIGNAL ASSEMBLY WITH TACTILE FEEDBACK

(75) Inventors: Jaron Rothkop, Royal Oak, MI (US); H. Winston Maue, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 40 days.

(21) Appl. No.: 10/394,372

(22) Filed: Mar. 21, 2003

(65) Prior Publication Data

US 2004/0090318 A1 May 13, 2004

Related U.S. Application Data

(60) Provisional application No. 60/372,570, filed on Apr. 12, 2002.

(51) Int. Cl.[7] .................................................. B60Q 1/00
(52) U.S. Cl. ................ 340/475; 340/425.5; 340/426.24; 340/435; 340/436; 340/407.1
(58) Field of Search ............................. 340/425.5, 475, 340/426.24, 426.25, 426.31, 435, 436, 438, 459, 407.1

(56) References Cited

U.S. PATENT DOCUMENTS

| | | |
|---|---|---|
| 5,339,075 A | 8/1994 | Abst et al. |
| 5,463,384 A | 10/1995 | Juds |
| 5,517,196 A | 5/1996 | Pakett et al. |
| 5,598,164 A | 1/1997 | Reppas et al. |
| 5,734,336 A | 3/1998 | Smithline |
| 5,765,116 A | 6/1998 | Wilson-Jones et al. |
| 5,767,793 A | 6/1998 | Agravante et al. |
| 5,786,772 A | 7/1998 | Schofield et al. |
| 5,790,050 A * | 8/1998 | Parker ................. 340/902 |
| 5,929,786 A | 7/1999 | Schofield et al. |
| 5,940,011 A | 8/1999 | Agravante et al. |
| 6,091,321 A | 7/2000 | Karell |
| 6,097,285 A | 8/2000 | Curtin |
| 6,211,778 B1 | 4/2001 | Reeves |
| 6,232,910 B1 | 5/2001 | Bell et al. |
| 6,236,306 B1 * | 5/2001 | Liebelt ................. 340/407.1 |
| 6,268,803 B1 | 7/2001 | Gunderson et al. |
| 6,744,370 B1 * | 6/2004 | Sleichter ................ 340/576 |

* cited by examiner

Primary Examiner—Daryl C. Pope
(74) Attorney, Agent, or Firm—Bill C. Panagos

(57) ABSTRACT

A turn signal assembly for use in a first vehicle having a vehicle proximity sensor system for detecting the proximity of a second vehicle. The turn signal assembly includes a stalk or handle movable between a first position, an intermediate position, and a second position. The assembly further includes a turn signal actuation device connected to the handle. The device is operable to actuate a light in response to the handle moving to one of the first and second positions from the intermediate position. A tactile feedback mechanism is mounted on the handle. The tactile feedback mechanism is adapted to provide a tactile response upon detection of a signal from the vehicle proximity sensor system of the presence of a second vehicle.

17 Claims, 2 Drawing Sheets

TURN SIGNAL ASSEMBLY WITH TACTILE FEEDBACK

CROSS REFERENCE TO RELATED APPLICATIONS

This application claims the benefit of U.S. Provisional Application No. 60/372,570 filed Apr. 12, 2002.

BACKGROUND OF THE INVENTION

This invention relates in general to collision avoidance or vehicle proximity sensor systems for vehicles, and in particular to mechanisms providing feedback to the driver in response to the presence of other vehicles within close proximity.

It is known to provide vehicles with proximity sensor systems to alert the driver when another vehicle is in close proximity. Typically, these systems use radar or ultrasonic transmitters mounted on the vehicle. The transmitters can be mounted on the front, rear or sides of the vehicles. The transmitters emit acoustic or radar waves or beams at predetermined zones of coverage. The zone can be in the front of the vehicle or at the rear of the vehicle to detect impending collisions. The zone of coverage can also be in a sideward direction, in particular to the "blind spot" area if the vehicle which is often not visible to the driver in the rear view and side view mirrors of the vehicle. The emitted beam is reflected off of another vehicle in the zone of coverage and is received by a receiver. The receiver provides a signal to a controller, such as a microprocessor, which interprets the signal and determines if the reflected signal has indicated the presence of a fairly large object, such as another vehicle. Through the use of Doppler shifts, the controller can determine if such a vehicle is present and/or the speed of the vehicle. The controller than actuates an alert device to inform the driver of the presence of the other vehicle in the zone of coverage. Known alert devices include audible alarms that emit a tone, whistle or buzzer. It is also known to use an indicator light in eyesight of the driver to alert the driver of the presence of the vehicle.

BRIEF SUMMARY OF THE INVENTION

This invention relates in general to turn signals, and particularly to turn signals that provide feedback to a driver when actuated.

The turn signal assembly of the present invention is for use in a first vehicle having a vehicle proximity sensor system for detecting the proximity of a second vehicle. The turn signal assembly includes a stalk or handle movable between a first position, an intermediate position, and a second position. The assembly further includes a turn signal actuation device connected to the handle. The device is operable to actuate a light in response to the handle moving to one of the first and second positions from the intermediate position. A tactile feedback mechanism is mounted on the handle. The tactile feedback mechanism is adapted to provide a tactile response upon detection of a signal from the vehicle proximity sensor system of the presence of a second vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
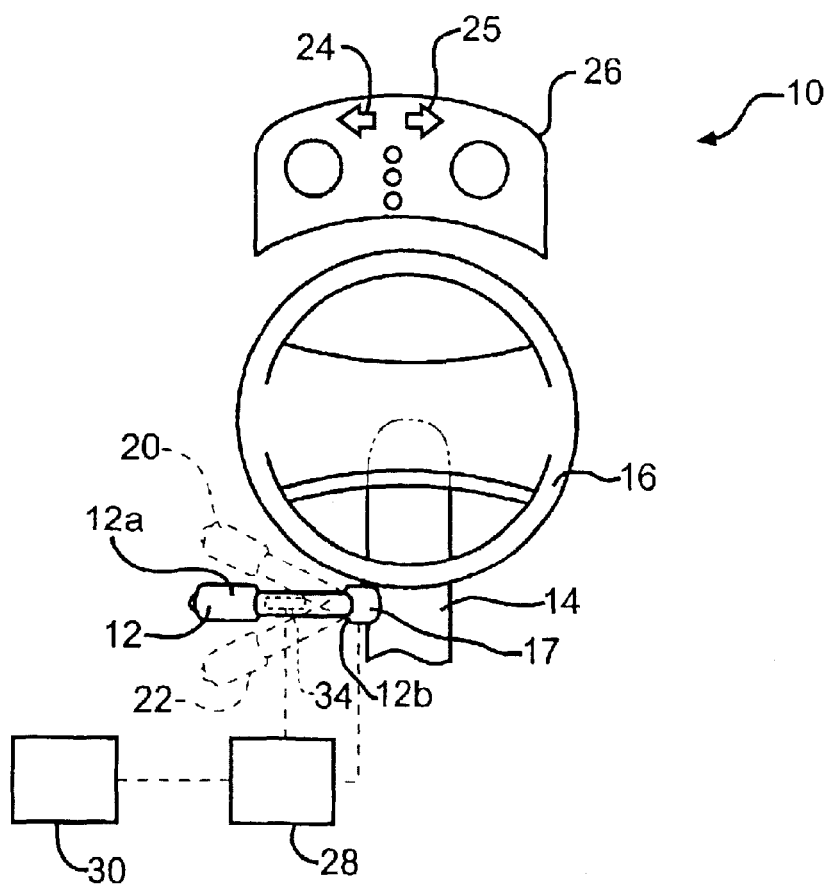
FIG. 1 is a schematic view of a turn signal assembly of the present invention.

Referring now to the drawings, there is illustrated in FIG. 1 a turn signal assembly, indicated generally at 10, in accordance with the present invention. The turn signal assembly 10 includes a handle or stalk 12 mounted for pivotal movement on a steering wheel column 14 or a steering wheel 16. The stalk 12 is generally elongated and extends outwardly from the steering wheel column 14. Generally, the stalk 12 is pivotally mounted on the steering wheel column at a first end 12a which is connected to a switch 17. A free or second end 12b of the stalk extends outwardly such that the end 12b can be easily accessed by the driver of the vehicle in which the turn signal assembly 10 is mounted. Although the stalk 12 and the switch 17 are shown and described as being mounted on the column 14, it should be understood that the stalk 12 and/or switch 17 could be mounted at any suitable location within the vehicle which is within reach of the driver, such as for example, on an instrument panel. Other vehicle accessory controls, such as cruise control, high and low beam driving lights, parking lights, hazard lights or other controls, can be mounted on the stalk 12.

The stalk 10 and switch 17 are designed to generally actuate a turn signal system incorporated into the assembly 10. The turn signal system is generally actuated by the movement of the stalk and provides a means for informing drivers of other vehicles on a roadway of the driver's intention to turn the vehicle or change lanes. The stalk 12 is movable between a neutral or intermediate position, as shown in solid lines in FIG. 1, to a first or upward position, indicated by broken lines 20 in FIG. 1. The stalk 12 is also movable between the intermediate position and a second or downward position, indicated by broken lines 22. Movement of the stalk 10 causes actuation of the switch 17. When in the intermediate position, the turn signal system is not activated. When in either of the first or second positions 20 and 22, the turn signal system is activated, as discussed in detail below, to indicate the driver's intention of turning the vehicle. Generally, the upward position 20 is representative of a right turn, and the downward position 22 is representative of a left turn.

The range of motion of the stalk 12 is in a generally vertical plane. When the stalk 12 is moved up or down within the generally vertical plane of motion, the switch 17 and turn signal system are actuated for a right or left turn respectively. Most vehicles also include a pair of indicator lights 24 and 25 on a main control display 26 of a vehicle to indicate to the driver that the turn signal system has been actuated to indicate either a right or left turn.

The assembly 10 further includes a controller 28, such as a microprocessor. The controller 28 can be mounted in any suitable location within the vehicle. The indicator lights 24 and 25 are connected to the switch 17 and/or controller 28 and are actuated to an "on" position to emit a light thereby alerting the driver that the turn signal system is activated. Preferably, the vehicle also includes exterior lights 29 and 30 (FIG. 3) mounted on the front and rear of the vehicle to indicate activation of the turn signal system to persons outside of the vehicle, such as other drivers of other vehicles. The exterior lights 29 and 30 can be connected and controlled by the switch 17 and/or the controller 29.

To indicate a left turn, the stalk 12 is moved down into the downward position 22. In this position, the turn signal system will indicate a left turn by activating the indicator lights 24 and 29. Similarly, to indicate a right turn, the stalk 12 can be moved up into its upward position 20 to activate the indicator lights 25 and 30.

Generally, when the stalk 12 is moved into one of the positions 20 and 22, the stalk 12 may be temporarily locked into the respective position. The stalk 12 can be moved from either locked position by the driver manually applying a slight force in the opposite direction to which the stalk 10 was moved. Also, the stalk 12 can be automatically unlocked and returned to the intermediate position if the steering wheel 16 is moved beyond a given point. For example, if the stalk 12 is moved into the position 20 to indicate a right turn, the stalk 12 will automatically return to the neutral position when the steering wheel is turned clockwise through a deactivation angle. This allows the driver to activate the turn signal system, turn the vehicle and continue driving without having to manually de-activate the turn signal system. The turn signal operates similarly for a left turn.

Preferably, the stalk 12 can also be moved into transitional positions between the intermediate position and the upward and downward positions 20 and 22. In either transitional position, the turn signal system will activate (either left or right). However, the stalk 12 will not be in a locked position. Therefore, when the driver manually releases the stalk 12, the stalk 12 will return to the intermediate position and the turn signal system will de-activate. Such movement of the stalk 12 is typical when the driver wishes to indicate a lane change or make a smaller turn that will not cause the steering wheel to move through the deactivation angle.

The turn signal assembly 10 is preferably connected to a proximity sensor system for detecting the proximity of a second vehicle in proximity to the vehicle in which the turn signal assembly is mounted. As will be described below, one or more sensors 30 are used for determining the presence of a second vehicle. The sensor 30 is connected to the controller 28.

Figure 3:
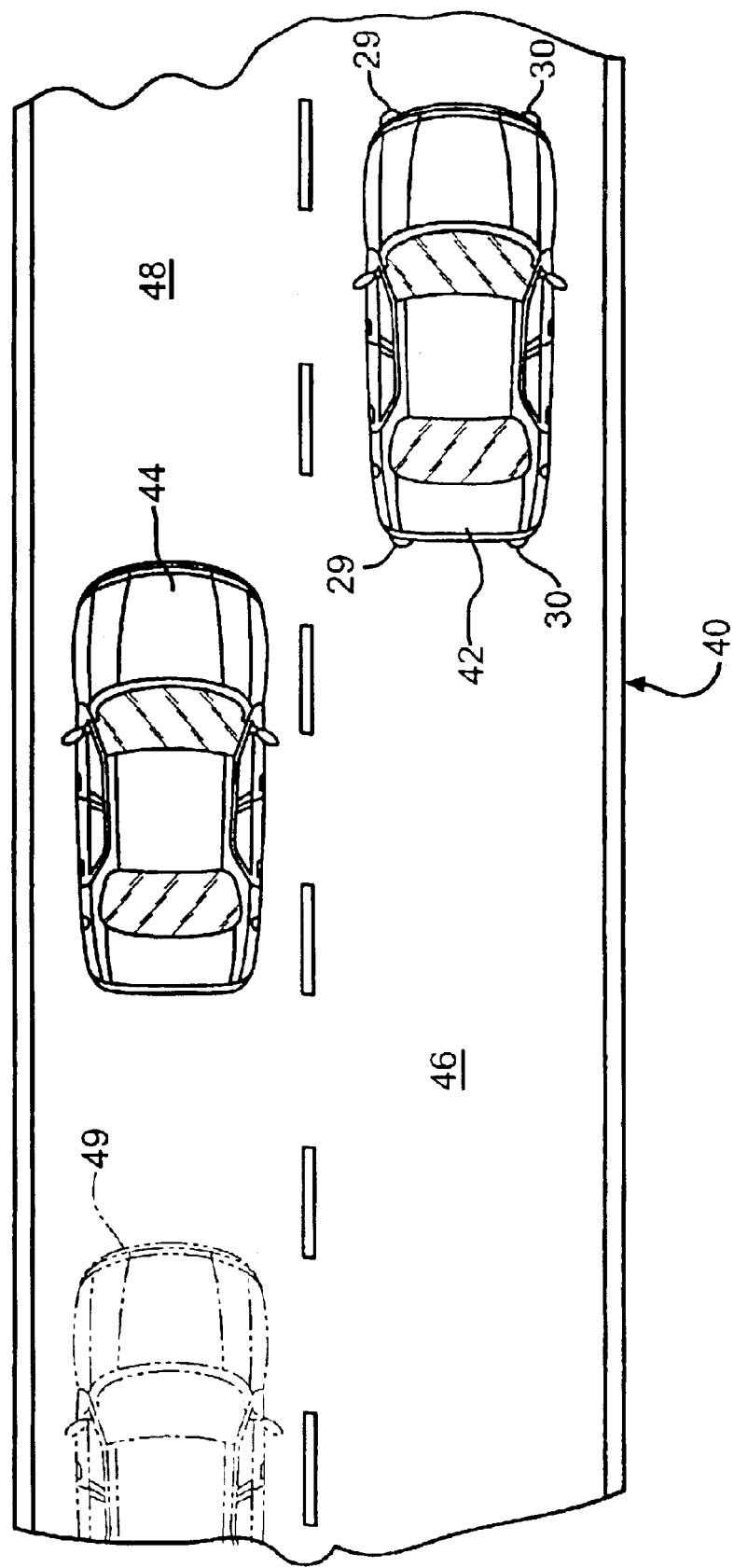
FIG. 3 a schematic plan view of a vehicle in which the turn signal assembly is installed and the surrounding roadway illustrating a proximity system for use with the turn signal assembly.

Referring now to FIG. 3, a roadway indicated generally at 40 is illustrated with a main vehicle 42 installed with the turn signal assembly 10 of the present invention. A second vehicle 44 is also traveling thereon. The main vehicle 42 can change lanes by moving from a first, driving lane 46 to a second, target lane 48. However, when changing lanes during driving, there often are other vehicles, such as the vehicle 44 in the target lane 48 into which the driver intends to enter. Ideally, when a driver activates a turn signal by means of the turn signal assembly 10 to indicate a lane change, the driver also verifies that a target area in the target lane 48 directly to the side and/or rear of the main vehicle 42 is clear of other traffic. This target area is generally defined as the continuously moving space about the periphery of the main vehicle 42 into which the main vehicle 42 would move upon completing a lane change. The target area is often in the blind spot of the driver. The blind spot is generally defined as the region to the sides and/or rear of the vehicle in which the driver may not be able to view the proximate vehicle in the rear and side view mirrors. The target area can be any size such as the same general size of the main vehicle 42 or preferably even larger extending rearwardly. The target lane 48 is the lane into which the main vehicle 42 intends to move. The amount of area within the target lane 48 that is detected by the sensor 30 varies with the number, position and actuation of the sensors on the vehicle 42. In order to prevent accidents and increase safety, it would be advantageous to have the turn signal assembly 10 convey information indicating to the driver when a second vehicle 44 is occupying the target area. In order to determine whether a second vehicle 44 occupies the target area, the vehicle 42 can include various sensors 30 mounted on the vehicle 42 to detect the presence of another vehicle 44 or other obstructions in the target lane 48. The sensors 30 can include one or more sensors to detect an obstruction in the "blind spot" of a driver, and the front, rear and/or side of the vehicle 42.

It is preferred that the sensors 30 are able to determine whether the object detected is a vehicle. The lane change sensors could detect when the vehicle 42 moves outside of certain roadway markings. To determine whether a vehicle is in the target area, the sensors are adapted to sense conditions that are predictive of a vehicle 44 approaching or in the target area. In a preferred embodiment, the sensors are proximity sensors which are adapted to sense the position and/or movement of a second vehicle 44 relative to the main vehicle 42. The sensed movement may be used to determine the velocity and/or acceleration of the second vehicle 44 relative to the first vehicle 42. Preferably, the sensors are adapted to sense position and movement of a plurality of vehicles in the vicinity of the main vehicle 42. The sensors can be any suitable proximity sensor for detecting the presence of the vehicle 44. For example, the sensors may include a transceiver for transmitting electromagnetic waves and receive feedback from the waves to sense surrounding vehicles. Suitable waves include microwaves, infrared waves, ultrasound waves, radio waves, electromagnetic waves, laser beams, and others.

The controller 28 is adapted to receive the signals generated by the sensors 30. The controller 28 can perform the predictive function in any suitable manner. Preferably, the controller 28 uses an algorithm which is adapted to predict the position of the second vehicle 44 based on the sensed conditions, such as the sensed position and movement of the second vehicle 44. In the illustrated embodiment, the controller 28 generates first and second signals representative of the predicted motion of the second vehicle 44.

Upon detection by one or more of the sensors 30 that a second vehicle 44 is either in the target lane 48 or the target area, the controller 30 will actuate a tactile feedback mechanism, indicated generally at 34, mounted on the stalk 12 to alert the driver to the presence of the second vehicle 24 in the target lane 48. Specifically, when the driver moves the stalk 12 out of the intermediate position to one of the positions 20 and 22, the controller 28 actuates the sensors 30 to detect the area surrounding the vehicle 42. It is preferred that the tactile turn signal feedback mechanism 34 operates to initiate the sensors to provide feedback any time the turn stalk 10 is moved out of the intermediate position. It is also preferred that the mechanism 34 operates in the transitional positions as that is when the stalk 12 must be held in position by the driver to actuate the turn signal. Therefore, a tactile feedback mechanism 34 would be more effective. If the sensors 30 and the controller 28 do not detect a vehicle 44 in the target area, as described above, then the mechanism 34 may not be actuated. However, if a vehicle 44 is detected when the driver actuates the turn stalk 12, then the turn signal system communicates the presence of the vehicle 44 in the driver's blind spot or in the target area by actuating the tactile feedback mechanism 34 by the controller 28.

Figure 2:
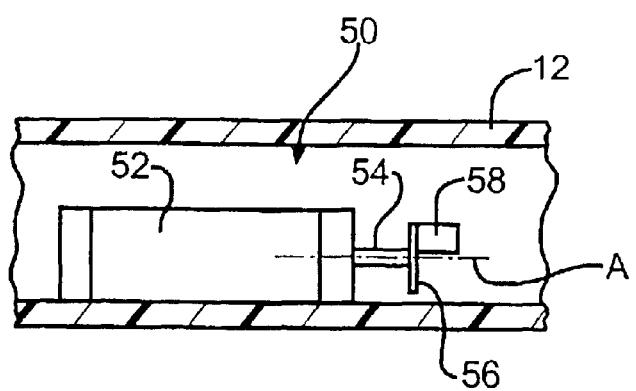
FIG. 2 is schematic cross-section view of an embodiment of a portion of the turn signal handle of the turn signal assembly of FIG. 1.

In a preferred embodiment, the tactile feedback is supplied by a vibrating mechanism, indicated generally at 50 in FIG. 2. The vibrating mechanism 50 is preferably mounted in a hollow portion of the stalk 12 and can be any suitable component which causes a vibration of the stalk 12. For example, the mechanism 50 may include an electric motor 52 connected to the controller 28 and actuatable by the controller 28 upon a signal therefrom. The motor 52 rotatably drives a shaft 54 about a rotational axis A. A plate 56 is connected to the end of the shaft 54 and is generally perpendicular to the axis A. A cam or weight 58 is connected to the plate. The weight 58 is mounted relative to the shaft 54 such that the center of gravity of the weight 58 is off-center from the axis A. When the motor 52 rotates the shaft 54 and the weight 58, the off-center mounting arrangement causes a vibration of the mechanism 50. Since the mechanism 50 is mounted on the stalk 12, the stalk 12 will also vibrate.

Preferably, a tactile feedback mechanism 34 can relay information indicative of the condition of the proximity of the second vehicle 44, instead of merely being actuatable to an "on" and "off" position. Thus, the tactile feedback mechanism 34 is preferably controllable to alter the tactile response dependent on the signal from the vehicle proximity sensor system corresponding to a condition of the proximity of the second 44 vehicle relative to the main vehicle 42. Conditions of proximity may include the closeness of the second vehicle relative to the main vehicle 42, and/or the speed of the second vehicle 44 relative to the main vehicle 42 or any combination thereof. For example, if the tactile feedback mechanism 34 is the vibrating mechanism 50, the rotational speed of the shaft 54 via the motor 52 could be increased or decreased to alter the frequency and/or the amplitude of the vibration. The amplitude of the vibration could also be controlled by altering the position of the weight 58 relative to the axis A, such as by a spring effected by the centrifugal force of the rotating weight 58.

Preferably, the intensity and strength of the vibration increases as the vehicle 44 is closer to the main vehicle 42. Thus, the driver receives additional information regarding the severity of the situation compared to merely being informed of the presence of the second vehicle 44 detected by the sensor 30. Additionally, the stalk 12 can be actuated if a distant second vehicle 44 is in the target lane 48 and is approaching the first vehicle 44 at a relatively high rate of speed relative to the main vehicle 42. The intensity and intermittence of the tactile feedback communicates the relative velocity of an approaching vehicle. It is preferred that the frequency and/or the amplitude of the vibrations of the stalk 12 be varied according to the potential danger of a vehicle in or approaching the target area in the target lane 48. Specifically, if the sensors 30 detect a vehicle in the target area, the controller 48 would trigger the most active response of the stalk 12. Also, a vehicle that is not in the target area, but is in the target lane 48 that is approaching at a high rate of speed would trigger an active response. Oppositely, a vehicle 44 that is in the target lane 48, but is a safe distance away or is moving at a slower or equal speed, could trigger a mild or no response.

While the tactile feedback mechanism 34 has been described as being a vibrating stalk 10, it should be understood that any other form of tactile response can be used. For example, the stalk 10 can increase in temperature, rotate, or change the outer texture of the stalk 12 to provide tactile feedback. For example, the tactile response could be raised ridges or bumps on the surface of the stalk 12. In the preferred embodiment, the stalk 12 vibrates laterally. However, the vibration could be in any direction. Additionally, the vibration could cause the stalk 12 to move in an axial direction along the length of the stalk 12. One of the advantages of the present invention is that the additional safety supplied by alerting the driver to another vehicle being in the target area or when turning while using the turning stalk 12 might encourage more people to use turn signals while driving.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A turn signal assembly for use in a first vehicle having a vehicle proximity sensor system for detecting the proximity of a second vehicle, said turn signal assembly comprising:
   a handle movable between a first position, an intermediate position, and a second position;
   a turn signal actuation device connected to said handle and operable to actuate a light in response to said handle moving to one of said first and second positions from said intermediate position; and
   a tactile feedback mechanism mounted on said handle, said tactile feedback mechanism adapted to provide a tactile response upon detection of a signal from the vehicle proximity sensor system of the presence of a second vehicle.

2. The assembly of claim 1, wherein said tactile feedback mechanism is controllable to alter the tactile response dependent on the signal from the vehicle proximity sensor system corresponding to one of the proximity of the second vehicle relative to the first vehicle and the speed of the second vehicle relative to the first vehicle.

3. The assembly of claim 1, wherein said tactile response is a vibration of said handle provided by a vibrating mechanism mounted in said handle.

4. The assembly of claim 3, wherein said vibrating mechanisms includes a motor driving an output shaft, said output shaft having a weight mounted off center of an axis defined by said output shaft.

5. The assembly of claim 3, wherein said vibrating mechanism is controllable to alter the amplitude of the vibration.

6. The assembly of claim 5, wherein said vibrating mechanism is controllable to alter the amplitude of the vibration dependent on the signal from the vehicle proximity sensor system corresponding to one of the proximity of the second vehicle relative to the first vehicle and the speed of the second vehicle relative to the first vehicle.

7. The assembly of claim 3, wherein said vibrating mechanism is controllable to alter the frequency of the vibration.

8. The assembly of claim 7, wherein said vibrating mechanism is controllable to alter the frequency of the vibration dependent on the signal from the vehicle proximity sensor system corresponding to one of the proximity of the second vehicle relative to the first vehicle and the speed of the second vehicle relative to the first vehicle.

9. The assembly of claim 1, wherein said tactile response is provided by a physical change in the surface texture of said handle.

10. The assembly of claim 1, wherein said tactile response is provided by a change in temperature of said handle.

11. The assembly of claim 1, wherein said light is an interior light adapted to indicate activation of the turn signal system to a driver of the first vehicle.

12. The assembly of claim 1, wherein said light is an exterior lights adapted to indicate activation of the turn signal system to persons outside of the first vehicle.

13. A system for use in a first vehicle comprising:
- a vehicle proximity sensor system for detecting the proximity of a second vehicle relative to the first vehicle, said proximity sensor system including:
  - at least one sensor for emitting a signal responsive to the proximity of the second vehicle relative to the first vehicle; and
  - a controller for receiving the signal from said sensor; and
- a turn signal assembly including:
  - a handle movable between a first position, an intermediate position, and a second position;
  - a turn signal actuation device connected to said handle and operable to actuate a light in response to said handle moving to one of said first and second positions from said intermediate position; and
  - a tactile feedback mechanism mounted on said handle, wherein said controller actuates said tactile feedback mechanism to provide a tactile response upon detection of a signal from the vehicle proximity sensor system of the presence of a second vehicle.

14. The system of claim 13, wherein said tactile feedback mechanism is controllable to alter the tactile response dependent on the signal from the vehicle proximity sensor system corresponding to one of the proximity of the second vehicle relative to the first vehicle and the speed of the second vehicle relative to the first vehicle.

15. The system of claim 13, wherein said tactile response is a vibration of said handle provided by a vibrating mechanism mounted in said handle.

16. The system of claim 15, wherein said vibrating mechanism is controllable to alter the amplitude of the vibration.

17. The system of claim 15, wherein said vibrating mechanism is controllable to alter the frequency of the vibration.

* * * * *